US011927348B2

(12) United States Patent
Porter et al.

(10) Patent No.: US 11,927,348 B2
(45) Date of Patent: Mar. 12, 2024

(54) AERODYNAMIC COMPONENT FOR A GAS TURBINE ENGINE

(71) Applicant: RTX Corporation, Farmington, CT (US)

(72) Inventors: Steven D. Porter, Wethersfield, CT (US); Jon E. Sobanski, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 95 days.

(21) Appl. No.: 17/535,027

(22) Filed: Nov. 24, 2021

(65) Prior Publication Data

US 2022/0082256 A1 Mar. 17, 2022

Related U.S. Application Data

(62) Division of application No. 16/358,195, filed on Mar. 19, 2019, now abandoned.

(51) Int. Cl.
| | |
|---|---|
| *F23R 3/00* | (2006.01) |
| *B21D 25/00* | (2006.01) |
| *B21D 31/00* | (2006.01) |
| *F01D 11/00* | (2006.01) |
| *F02C 3/04* | (2006.01) |
| *F23M 5/04* | (2006.01) |
| *F23R 3/60* | (2006.01) |

(52) U.S. Cl.
CPC .............. *F23R 3/002* (2013.01); *B21D 25/00* (2013.01); *B21D 31/005* (2013.01); *F01D 11/005* (2013.01); *F02C 3/04* (2013.01); *F23M 5/04* (2013.01); *F23R 3/60* (2013.01); *F23R 2900/00018* (2013.01)

(58) Field of Classification Search
CPC .. F23R 2900/00017; F23R 2900/00018; F23R 3/16; F23R 3/42; F23R 3/002; F23R 3/60; F23M 5/04; F02C 3/04; F01D 11/005; F01D 25/14; B21D 25/00; B21D 31/005
See application file for complete search history.

(56) References Cited

U.S. PATENT DOCUMENTS

| | | | |
|---|---|---|---|
| 4,422,300 | A | 12/1983 | Dierberger et al. |
| 4,688,310 | A | 8/1987 | Kelm et al. |
| 7,452,183 | B2 | 11/2008 | Ruthemeyer et al. |
| 2015/0176843 | A1 | 6/2015 | Garry et al. |
| 2016/0377296 | A1 | 12/2016 | Bangerter et al. |

FOREIGN PATENT DOCUMENTS

| | | |
|---|---|---|
| EP | 3236156 A1 | 10/2017 |
| EP | 3381591 A1 | 10/2018 |

OTHER PUBLICATIONS

European Search Report Application No. 20163663.6; dated Jun. 15, 2020; pp. 12.

*Primary Examiner* — Moshe Wilensky
(74) *Attorney, Agent, or Firm* — CANTOR COLBURN LLP

(57) ABSTRACT

An aerodynamic component of a gas turbine engine is provided and is fittable to a shell having a shell shape. The aerodynamic component includes a body having a component shape initially deviating from the shell shape prior to an assembly operation in which the aerodynamic component is to be fit to the shell. Deviation of the component shape from the shell shape aids in an establishment of a final desired shape of the aerodynamic component following the assembly operation.

9 Claims, 9 Drawing Sheets ved to have a substantially uniform radius of curvature similar to the substantially uniform radius of curvature of the shell.

AERODYNAMIC COMPONENT FOR A GAS TURBINE ENGINE

CROSS-REFERENCE TO RELATED APPLICATIONS

This application is a Division of Non-Provisional application Ser. No. 16/358,195 filed Mar. 19, 2019, the disclosure of which is incorporated herein by reference in its entirety.

BACKGROUND

Exemplary embodiments of the present disclosure relate generally to aerodynamic components and, in one embodiment, to a pre-deflected combustor panel for a combustor shell fit-up.

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors and the turbine section includes low and high pressure turbines.

Within the compressor section, high energy fluids aerodynamically interact with blades and vanes such that air flowing into the gas turbine engine can be compressed. Likewise, within the turbine section, high energy fluids, such as the products of combustion, aerodynamically interact with blades and vanes in order to expand and to thereby drive compressor and rotor rotation.

During assembly processes, combustor panels of the combustion section are typically checked for dimensional accuracy only prior to coating processes. Following this dimensional check, the combustor panels are coated with multiple, various coating materials and laser drilled. In some cases, the combustor panels may also be subjected to shot peening. Thus, since the dimensional accuracy check is typically only done once, it is often the case that combustor panels are not dimensionally sound by the time manufacturing processes are concluded. Such combustor panels will tend to not fit perfectly up to combustor shells at assembly.

Any misalignment between combustor panels and shells at assembly can create pre-loads and strain in the combustor panels when they are bolted down. These pre-loads and strain can contribute to early coating spallation, which reduces combustor life and results in early engine pulls. Accordingly, it is desirable to have combustor panels be formed and deformed in order to more accurately fit onto combustor shells.

BRIEF DESCRIPTION

According to an aspect of the disclosure, an aerodynamic component of a gas turbine engine is provided and is fittable to a shell having a shell shape. The aerodynamic component includes a body having a component shape initially deviating from the shell shape prior to an assembly operation in which the aerodynamic component is to be fit to the shell. Deviation of the component shape from the shell shape aids in an establishment of a final desired shape of the aerodynamic component following the assembly operation.

In accordance with additional or alternative embodiments, the shell is an inner diameter shell with a substantially uniform radius of curvature, the shell includes an exterior surface to which the aerodynamic component is fittable, and the deviation is accomplished by the body being cast to have a radius of curvature, which is similar to the substantially uniform radius of curvature of the shell at a central point of the body and which decreases toward opposite edges of the body, and deformed to have a substantially uniform radius of curvature similar to the substantially uniform radius of curvature of the shell.

In accordance with additional or alternative embodiments, the shell is an inner diameter shell with a substantially uniform radius of curvature, the shell includes an exterior surface to which the aerodynamic component is fittable, and the deviation is accomplished by the body being cast to have a radius of curvature, which is similar to the substantially uniform radius of curvature of the shell at an edge of the body and which decreases toward an opposite edge of the body, and deformed to have a substantially uniform radius of curvature similar to the substantially uniform radius of curvature of the shell.

In accordance with additional or alternative embodiments, the shell is an outer diameter shell with a substantially uniform radius of curvature, the shell includes an interior surface to which the aerodynamic component is fittable, and the deviation is accomplished by the body being cast to have a radius of curvature, which is similar to the substantially uniform radius of curvature of the combustor shell at a central point of the body and which increases toward opposite edges of the body, and deformed to have a substantially uniform radius of curvature similar to the substantially uniform radius of curvature of the shell.

In accordance with additional or alternative embodiments, the shell is an outer diameter shell with a substantially uniform radius of curvature, the shell comprises an interior surface to which the aerodynamic component is fittable, and the deviation is accomplished by the body being cast to have a radius of curvature, which is similar to the substantially uniform radius of curvature of the combustor shell at an edge of the body and which increases toward an opposite edge of the body, and deformed to have a substantially uniform radius of curvature similar to the substantially uniform radius of curvature of the shell.

According to another aspect of the disclosure, a combustor section of a gas turbine engine is provided and includes an inner diameter shell having a shell shape, an outer diameter shell having a shell shape, an inner diameter shell panel according to the aerodynamic component to be fit to an exterior surface of the inner diameter shell and an outer diameter shell panel according to the aerodynamic component to be fit to an interior surface of the outer diameter shell.

According to another aspect of the disclosure, a method of manufacturing an aerodynamic component to be fittable to a shell in a gas turbine engine is provided. The method includes forming materials of the aerodynamic component into a body having an initial shape that deviates from a shape of the shell and deforming the body to assume a second shape that corresponds to the shape of the shell. The forming of the materials of the aerodynamic component into the body having the initial shape is executed such that deviation of the initial shape from the shape of the shell aids in an assumption of the second shape by the body.

In accordance with additional or alternative embodiments, the forming includes casting the materials of the aerodynamic component into the body having the second shape and cold working the body from the second shape into the initial shape and the deforming includes securing the body having the initial shape in a fixture and coating and/or laser drilling the body from the initial shape into the second shape.

In accordance with additional or alternative embodiments, the coating includes electron-beam physical vapor deposition (EBPVD).

In accordance with additional or alternative embodiments, the forming includes casting the materials of the aerodynamic component into the body having the second shape and securing the body in a deformed fixture such that the body assumes the initial shape and the deforming includes coating and/or laser drilling the body from the initial shape into the second shape.

In accordance with additional or alternative embodiments, the coating includes electron-beam physical vapor deposition (EBPVD).

In accordance with additional or alternative embodiments, the forming includes casting the materials of the aerodynamic component into the body having the initial shape and the deforming includes securing the body in a deformed fixture and coating and/or laser drilling the body from the initial shape into the second shape.

In accordance with additional or alternative embodiments, the coating includes electron-beam physical vapor deposition (EBPVD).

In accordance with additional or alternative embodiments, the shell is an inner diameter shell with a substantially uniform radius of curvature, the shell includes an exterior surface to which the aerodynamic component is fittable, the forming is executed such that the body has a radius of curvature, which is similar to the substantially uniform radius of curvature of the combustor shell at a central point of the body and which decreases toward opposite edges of the body, and the deforming is executed such that the body has a substantially uniform radius of curvature similar to the substantially uniform radius of curvature of the shell.

In accordance with additional or alternative embodiments, the shell is an inner diameter shell with a substantially uniform radius of curvature, the shell comprises an exterior surface to which the aerodynamic component is fittable, the forming is executed such that the body has a radius of curvature, which is similar to the substantially uniform radius of curvature of the combustor shell at an edge of the body and which decreases toward an opposite edge of the body, and the deforming is executed such that the body has a substantially uniform radius of curvature similar to the substantially uniform radius of curvature of the shell.

In accordance with additional or alternative embodiments, the shell is an outer diameter shell with a substantially uniform radius of curvature, the shell comprises an interior surface to which the aerodynamic component is fittable, the forming is executed such that the body has a radius of curvature, which is similar to the substantially uniform radius of curvature of the combustor shell at a central point of the body and which increases toward opposite edges of the body, and the deforming is executed such that the body has a substantially uniform radius of curvature similar to the substantially uniform radius of curvature of the shell.

In accordance with additional or alternative embodiments, the shell is an outer diameter shell with a substantially uniform radius of curvature, the shell comprises an interior surface to which the aerodynamic component is fittable, the forming is executed such that the body has a radius of curvature, which is similar to the substantially uniform radius of curvature of the combustor shell at an edge of the body and which increases toward an opposite edge of the body, and the deforming is executed such that the body has a substantially uniform radius of curvature similar to the substantially uniform radius of curvature of the shell.

According to another aspect of the disclosure, a method of aerodynamic component manufacturing is provided. The method includes forming the aerodynamic component with an initial shape that deviates from a normal and final desired curvature during an initial manufacturing process and deforming the aerodynamic component during a subsequent manufacturing process which results in the aerodynamic component being fittable to a shell. The forming is executed such that the aerodynamic component assumes the normal and final desired curvature upon completion of the deforming during the subsequent manufacturing process.

In accordance with additional or alternative embodiments, the forming includes casting and then cold working the aerodynamic component into the initial shape and the deforming includes securing the aerodynamic component having the initial shape in a fixture and coating and/or laser drilling the aerodynamic component such that the aerodynamic component assumes the normal and final desired curvature.

In accordance with additional or alternative embodiments, the forming includes casting the aerodynamic component to assume the normal and desired final curvature and securing the aerodynamic component in a deformed fixture such that the aerodynamic component assumes the initial shape and the deforming includes coating and/or laser drilling the aerodynamic component such that the aerodynamic component assumes the normal and desired final curvature.

In accordance with additional or alternative embodiments, the forming includes casting the aerodynamic component to have the initial shape and the deforming includes securing the aerodynamic component in a deformed fixture and coating and/or laser drilling the aerodynamic component such that the aerodynamic component assumes the normal and desired final curvature.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
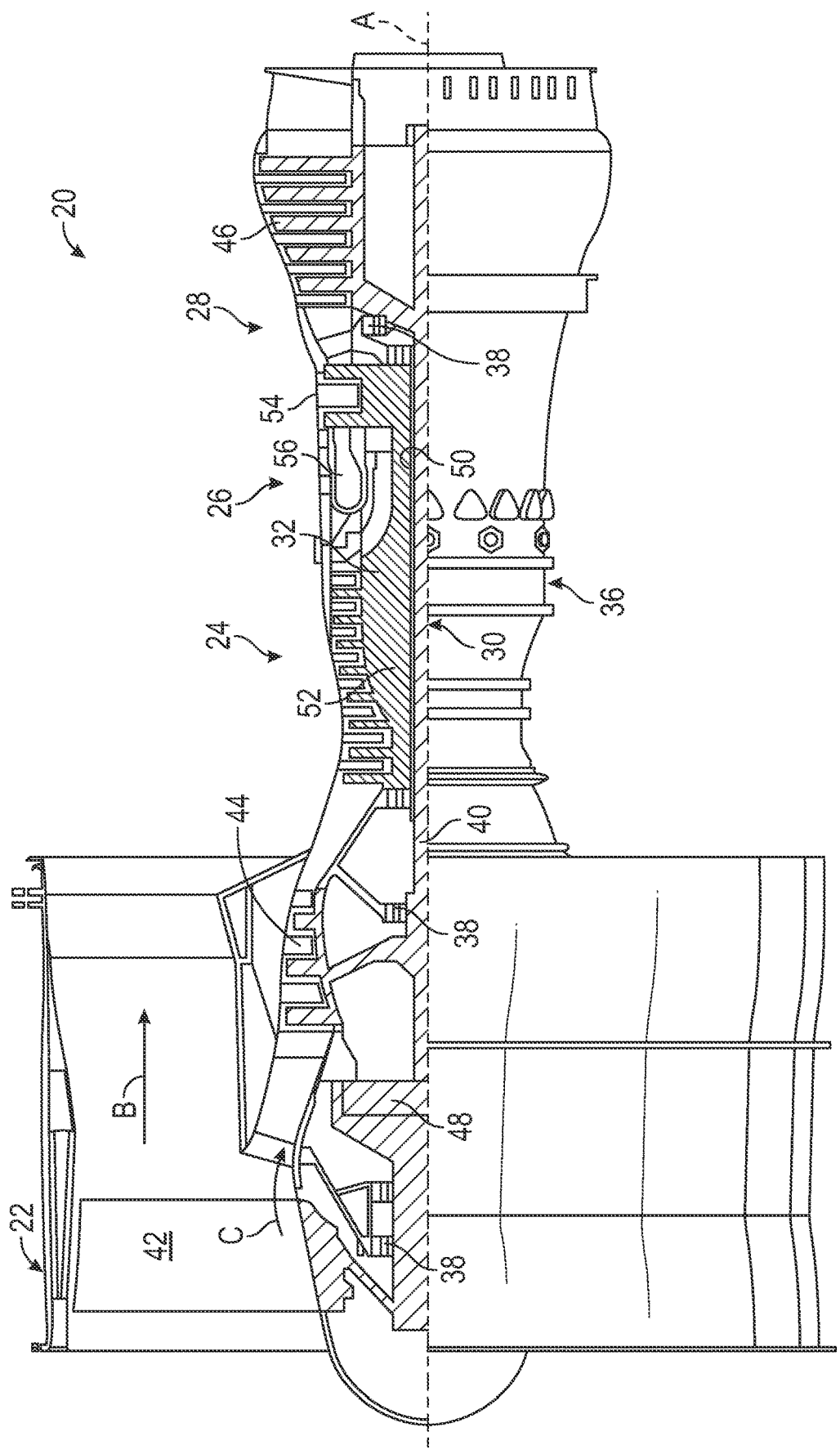
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

As will be described below, an aerodynamic component, such as a combustor panel is provided for use in the combustor 56 of the combustor section 26 of the gas turbine engine 20 described above. The aerodynamic component initially has a non-nominal shape and is deformed during processing and/or assembly so that the aerodynamic component has a desired shape.

The following description will generally relate to the cases of the aerodynamic component being provided as a combustor panel that is fittable to a combustor shell. This is done for purposes of clarity and brevity and should not be read or interpreted in a manner that otherwise limits the scope of the description or the following claims.

Figure 2:
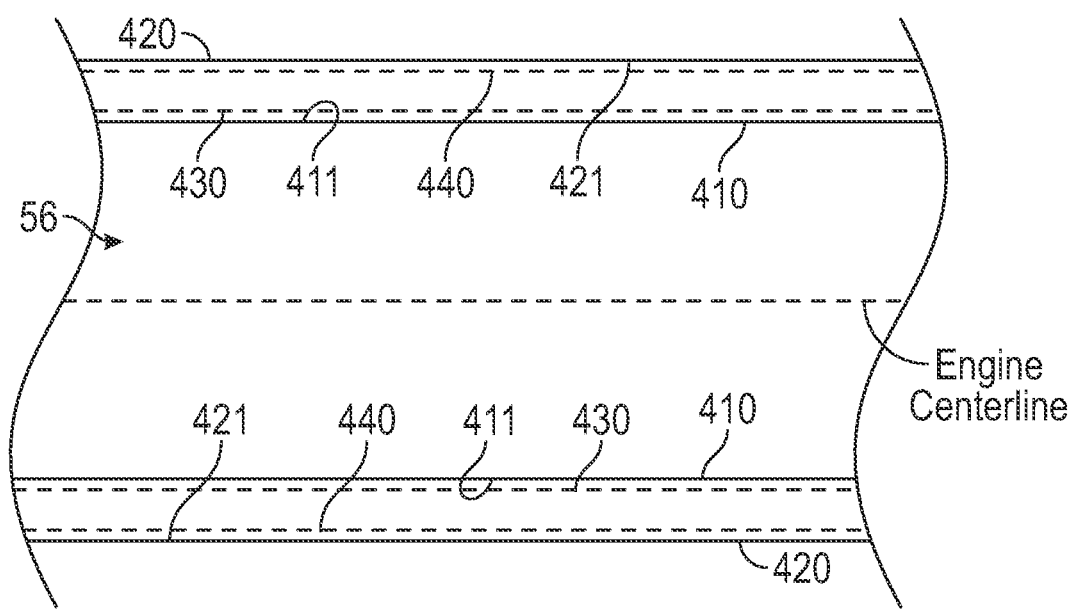
FIG. 2 is a side schematic view of a combustor or a combustor section of a gas turbine engine in accordance with embodiments.

With reference to FIG. 2, the combustor 56 of the combustor section 26 of the gas turbine engine 20 (see FIG. 1) includes an inner diameter shell 410 and an outer diameter shell 420. The inner diameter shell 410 could have a cylindrical, conical or another similar shape, and the outer diameter shell 420 could have a cylindrical, conical or another similar shape. The combustor 56 further includes a plurality of inner diameter panels 430 and a plurality of outer diameter panels 440. The inner diameter panels 430 are configured to be fit to a radially outer surface 411 of the inner diameter shell 410 but are each formed with a panel shape that deviates from the shell shape of the inner diameter shell 410. The outer diameter panels 440 are configured to be fit to radially inner surface 421 of the outer diameter shell 420 but are each formed with a panel shape that deviates from the shell shape of the outer diameter shell 420.

An annulus formed between the inner diameter shell 410 and the inner diameter panels 430 and the outer diameter shell 420 and the outer diameter panels 440 defines the combustion chamber of the combustor 56.

As will be explained below, the respective deviations of the respective panel shapes of the inner and outer diameter panels 430 and 440 serves to aid in the inner and outer diameter panels 430 and 440 assuming their respectively desired final (i.e., fully assembled) shapes, reduces spallation and improves an overall lifespan of the combustor 56.

Figure 3:
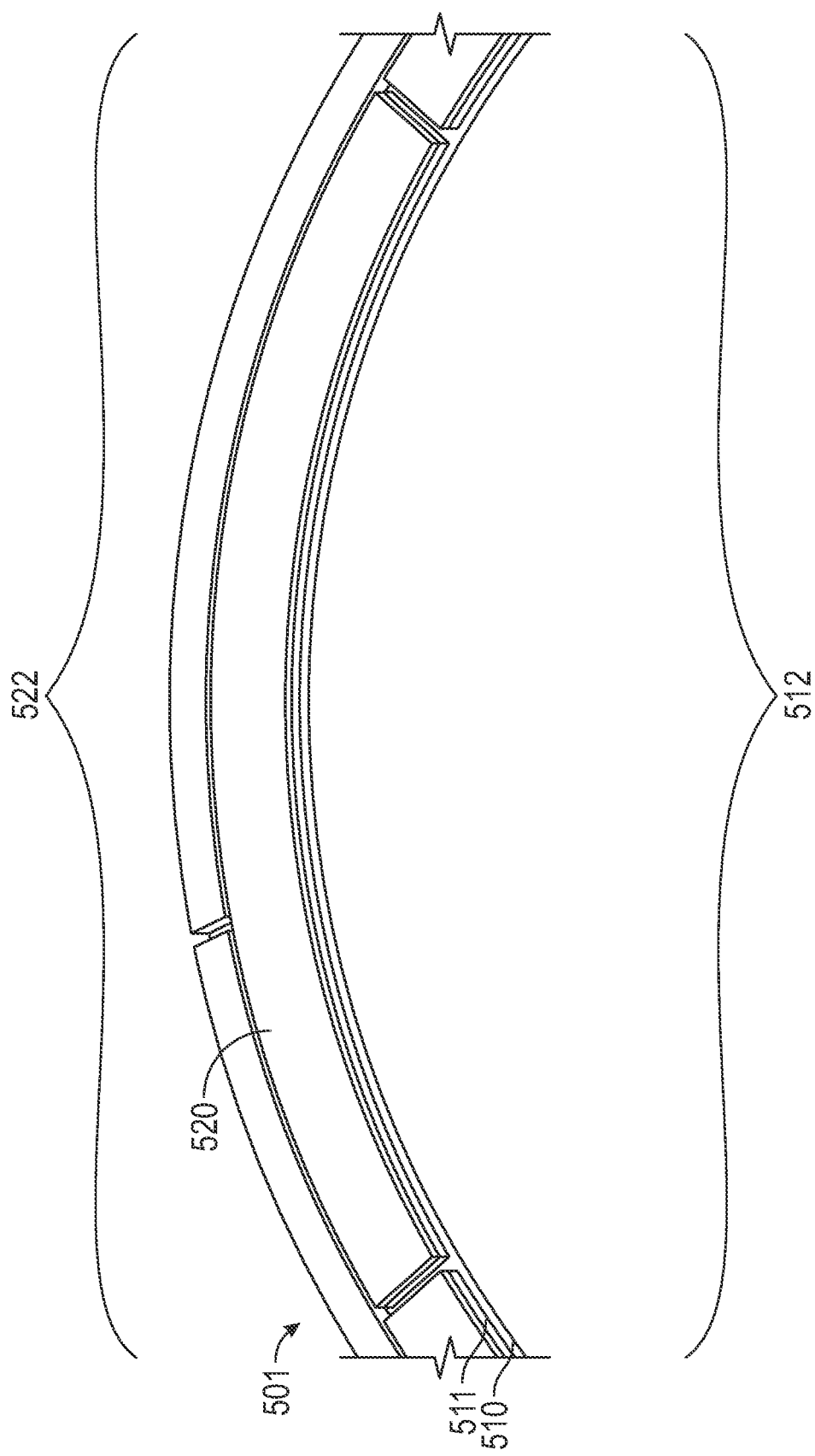
FIG. 3 is a perspective of a combustor panel to be fit to an inner combustor shell in accordance with embodiments.
Figure 4:
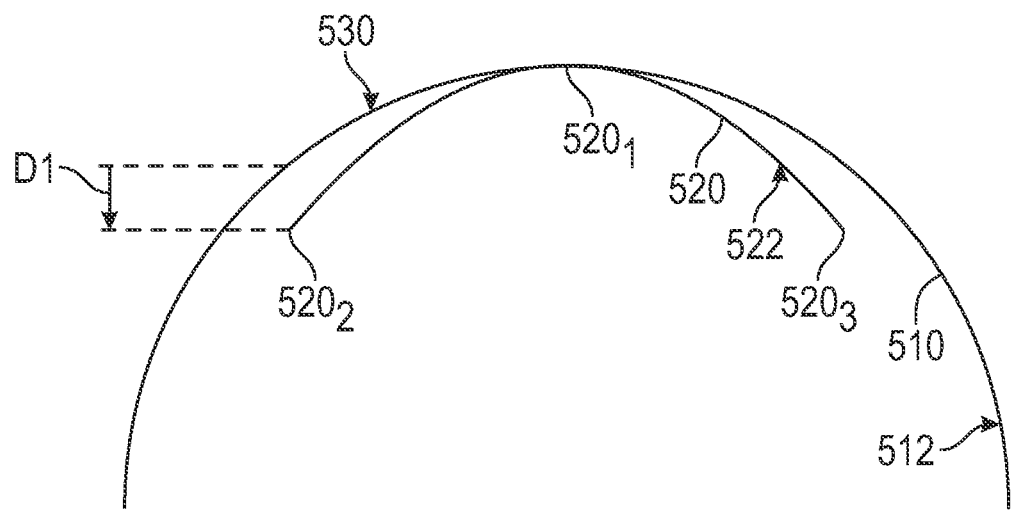
FIG. 4 is a side schematic view illustrating a deformation of the combustor panel of FIG. 3 during assembly in accordance with embodiments.
Figure 5:
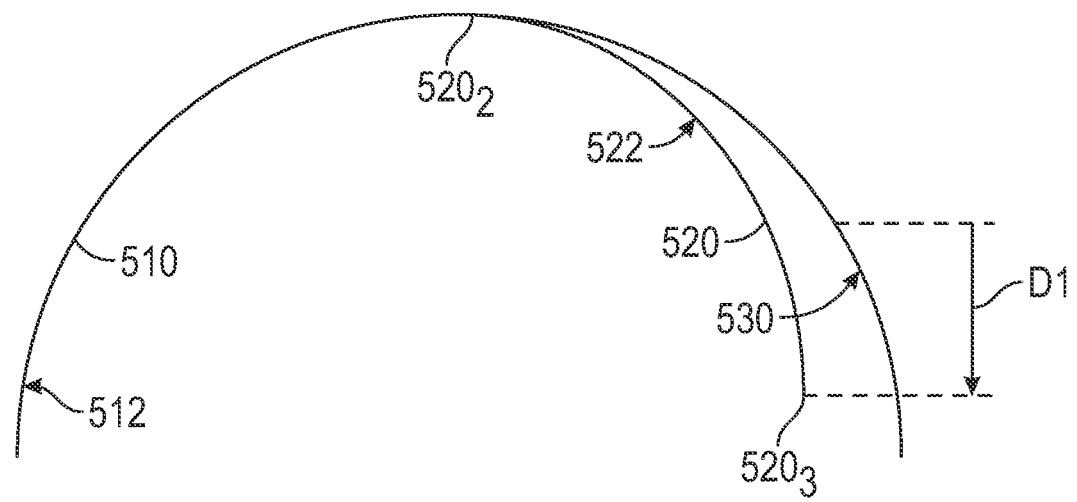
FIG. 5 is a side schematic view illustrating a deformation of the combustor panel of FIG. 3 during assembly in accordance with embodiments.

With reference to FIGS. 3, 4 and 5, a combustor panel 501 is fittable to an exterior surface 511 of an inner diameter combustor shell 510 that has a shell shape (e.g., cylindrical or conical) 512 with a substantially uniform radius of curvature. The combustor panel 501 includes a body 520 having a panel shape 522. When the body 520 is formed (e.g., by casting), the panel shape 522 initially has a nominal shape that corresponds to the shell shape 512 or deviates from the shell shape 512 in a first direction D1 (see FIGS. 4 and 5). The following description will relate generally to the case of the panel shape 522 initially deviating from the shell shape 512 in the first direction D1.

The body 520 is deformed such that the panel shape 522 corresponds to the shell shape 512. The deformation can be caused by coating and/or laser drilling processes whereby, while the panel shape 522 of the body 520 corresponds to the shell shape 512, the body 520 is effectively pre-loaded or biased toward re-assuming the panel shape 522 that deviates from the shell shape 512 in the first direction D1. At this point, an assembly operation can be executed in which the combustor panel 501 is fit to the exterior surface 511 of the inner diameter combustor shell 510 whereby the pre-loading or biasing of the panel shape 522 effectively aids in an establishment of a final desired shape of the combustor panel 501 following manufacturing operations subsequent to the assembly operation.

That is, the pre-loading or biasing of the panel shape 522 toward re-assuming the panel shape 522 that deviates from the shell shape 512 in the first direction D1 provides the combustor panel 501 with a spring-like characteristic that increases a tendency of the combustor panel 501 to assume a shape that fits to the exterior surface 511 of the inner diameter combustor shell 510.

It is to be understood that the establishment of the final desired shape of the combustor panel 501 as described above aids in the establishment of an improved sealing capability of the combustor panel 501. This improved sealing capacity arises from the final desired shape of the combustor panel 501 being highly similar to the shell shape 512 of the combustor shell 510.

As shown in FIG. 4, the initial deviation of the panel shape 522 from the shell shape 512 in the first direction D1 is accomplished by the body 520 being cast to have a radius of curvature, which is similar to the substantially uniform radius of curvature of the inner diameter combustor shell 510 at a central point $520_1$ of the body 520 and which decreases toward opposite edges $520_2$ and $520_3$ of the body 520.

As explained above, as a result of the initial deviation and the subsequent deformation, the body 520 is provided with a spring-like or elastic quality whereby the body 520 is biased toward assuming the nominal shape 530 and thus has a substantially uniform radius of curvature that is similar to the substantially uniform radius of curvature of the combustor shell 510.

As shown in FIG. 5, the initial deviation of the panel shape 522 from the shell shape 512 in the first direction D1 is accomplished by the body 520 being cast to have a radius of curvature, which is similar to the substantially uniform radius of curvature of the inner diameter combustor shell 510 at an edge $520_2$ of the body 520 and which decreases toward an opposite edge $520_3$ of the body 520.

As explained above, as a result of the initial deviation and the subsequent deformation, the body 520 is provided with a spring-like or elastic quality whereby the body 520 is biased toward assuming the nominal shape 530 and thus has a substantially uniform radius of curvature that is similar to the substantially uniform radius of curvature of the combustor shell 510.

Figure 6:
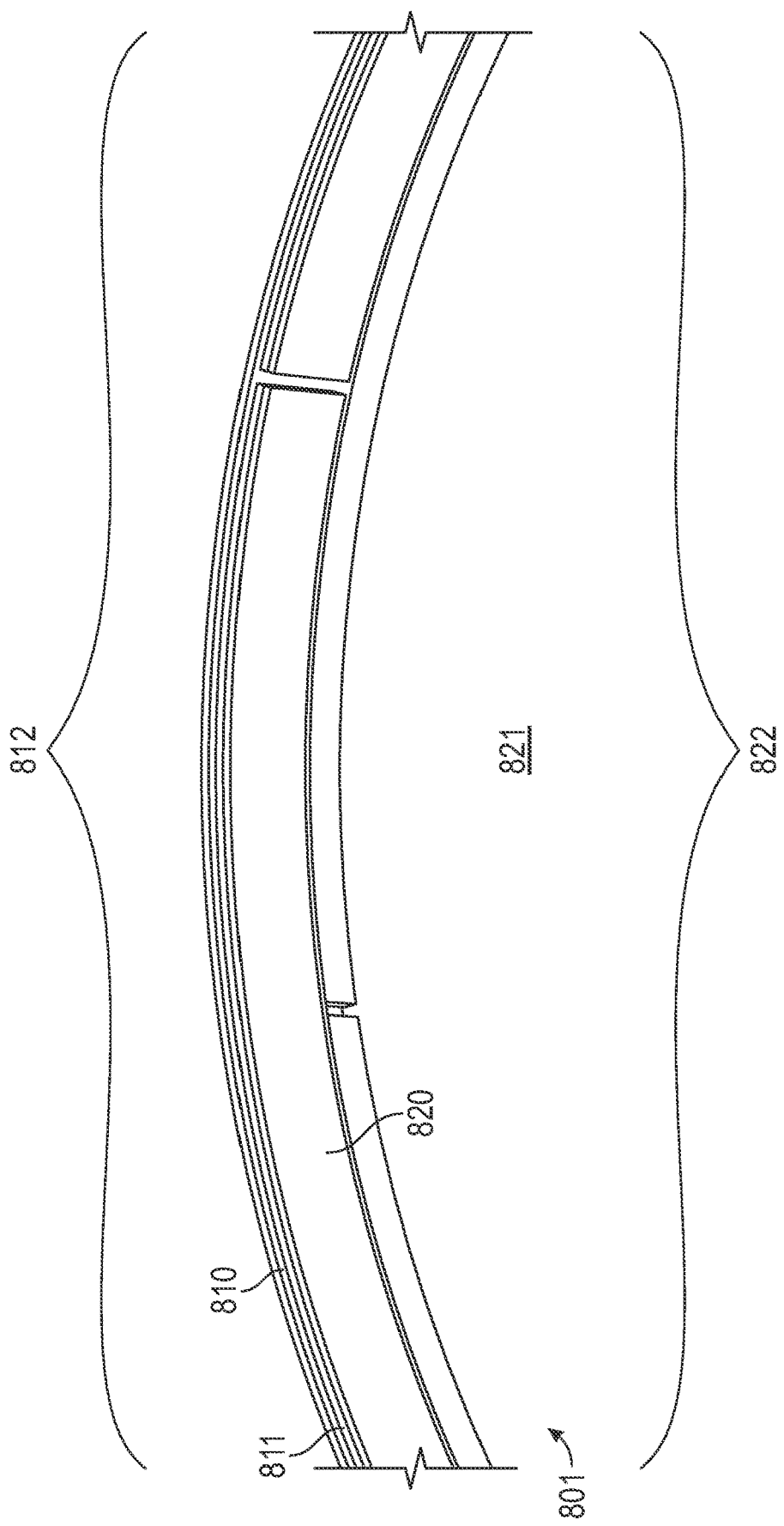
FIG. 6 is a perspective of a combustor panel to be fit to an outer combustor shell in accordance with embodiments.
Figure 7:
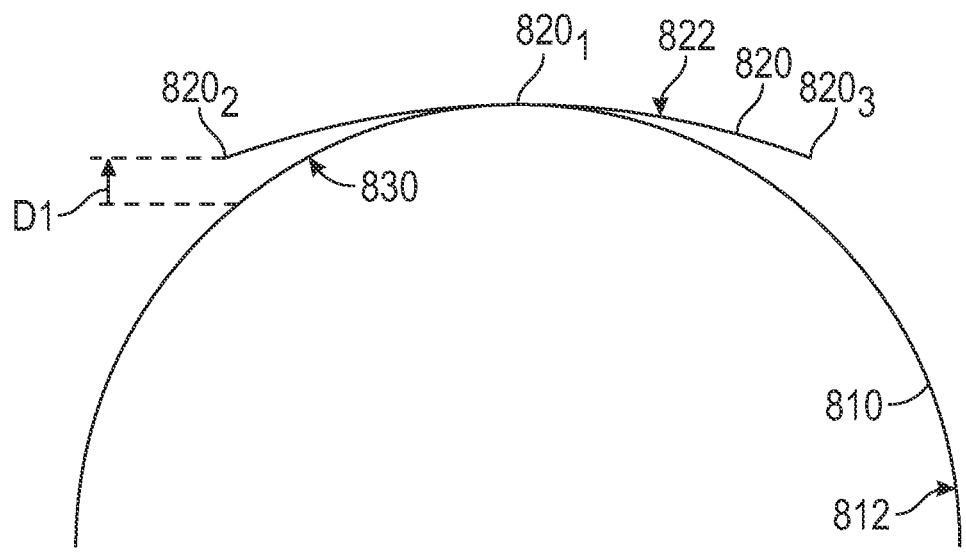
FIG. 7 is a side schematic view illustrating a deformation of the combustor panel of FIG. 6 during assembly in accordance with embodiments.
Figure 8:
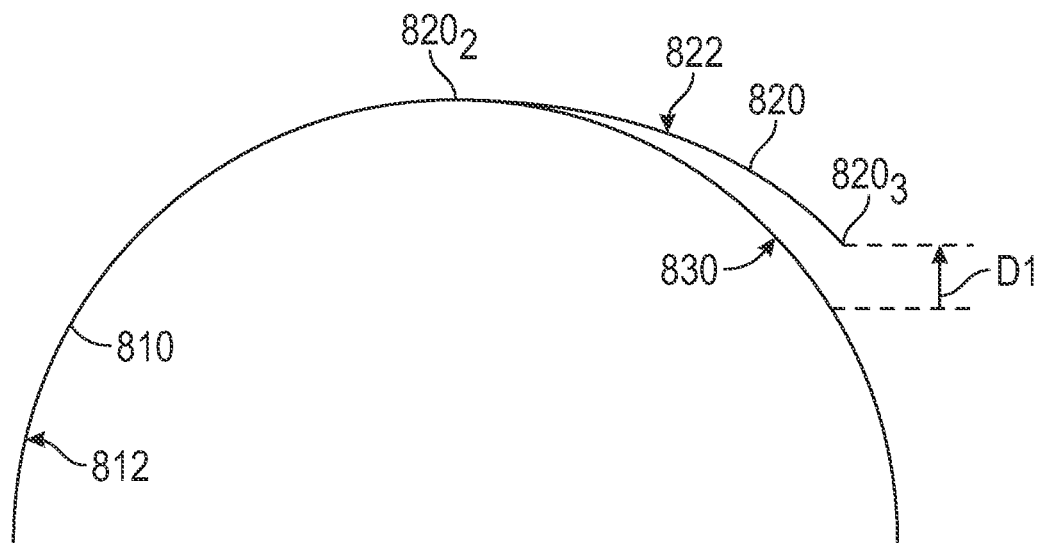
FIG. 8 is a side schematic view illustrating a deformation of the combustor panel of FIG. 6 during assembly in accordance with embodiments.

With reference to FIGS. 6, 7 and 8, a combustor panel 801 is fittable to an interior surface 811 of an outer diameter combustor shell 810 that has a shell shape (e.g., cylindrical or conical) 812 with a substantially uniform radius of curvature. The combustor panel 801 includes a body 820 having a panel shape 822. When the body 820 is formed (e.g., by casting), the panel shape 822 initially has a nominal shape that corresponds to the shell shape 812 or deviates from the shell shape 812 in a first direction D1 (see FIGS. 7 and 8). The following description will relate generally to the case of the panel shape 522 initially deviating from the shell shape in the first direction D1.

The body 820 is deformed such that the panel shape 822 corresponds to the shell shape 812. The deformation can be caused by coating and/or laser drilling processes whereby, while the panel shape 822 of the body 820 corresponds to the shell shape 812, the body 820 is effectively pre-loaded or biased toward re-assuming the panel shape 822 that deviates from the shell shape 812 in the first direction D1. At this point, an assembly operation can be executed in which the combustor panel 801 is fit to the interior surface 811 of the outer diameter combustor shell 810 whereby the pre-loading or biasing of the panel shape 822 effectively aids in an establishment of a final desired shape of the combustor panel 801 following manufacturing operations subsequent to the assembly operation.

That is, the pre-loading or biasing of the panel shape 822 toward re-assuming the panel shape 822 that deviates from the shell shape 812 in the first direction D1 provides the combustor panel 801 with a spring-like characteristic that increases a tendency of the combustor panel 801 to assume a shape that fits to the interior surface 811 of the outer diameter combustor shell 810.

It is to be understood that the establishment of the final desired shape of the combustor panel 801 as described above aids in the establishment of an improved sealing capability of the combustor panel 801. This improved sealing capacity arises from the final desired shape of the combustor panel 801 being highly similar to the shell shape 812 of the combustor shell 810.

As shown in FIG. 7, the initial deviation of the panel shape 822 from the shell shape 812 in the first direction D1 is accomplished by the body 820 being cast to have a radius of curvature, which is similar to the substantially uniform radius of curvature of the outer diameter combustor shell 810 at a central point 820$_1$ of the body 820 and which increases toward opposite edges 820$_2$ and 820$_3$ of the body 820.

As explained above, as a result of the initial deviation and the subsequent deformation, the body 820 is provided with a spring-like or elastic quality whereby the body 820 is biased toward assuming the nominal shape 830 and thus has a substantially uniform radius of curvature that is similar to the substantially uniform radius of curvature of the combustor shell 810.

As shown in FIG. 8, the initial deviation of the panel shape 822 from the shell shape 812 in the first direction D1 is accomplished by the body 820 being cast to have a radius of curvature, which is similar to the substantially uniform radius of curvature of the outer diameter combustor shell 810 at an edge 820$_2$ of the body 820 and which increases toward an opposite edge 820$_3$ of the body 820.

As explained above, as a result of the initial deviation and the deformation, the body 820 is provided with a spring-like or elastic quality whereby the body 820 is biased toward assuming the nominal shape 830 and thus has a substantially uniform radius of curvature that is similar to the substantially uniform radius of curvature of the combustor shell 810.

Figure 9:
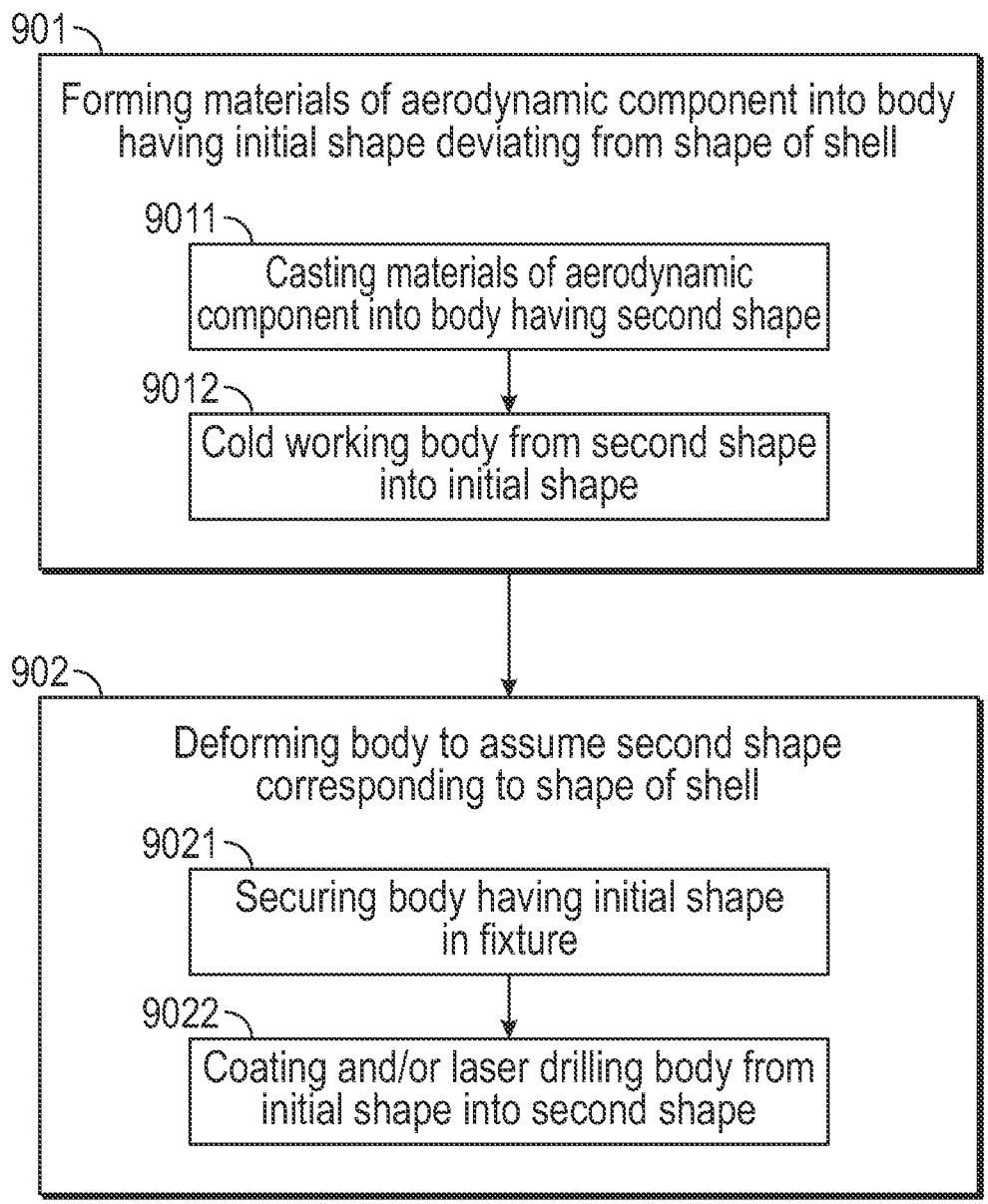
FIG. 9 is a flow diagram illustrating a method of manufacturing an aerodynamic component in accordance with embodiments.

With reference to FIG. 9, a method of manufacturing an aerodynamic component to be fittable to a shell in a gas turbine engine is provided and includes an initial manufacturing process including forming materials of the aerodynamic component into a body having an initial shape that deviates from a shape of the shell (901) and a subsequent manufacturing processing including deforming the body to assume a second shape that corresponds to the shape of the shell (902). Here, the forming of operation 901 is executed such that deviation of the initial shape from the shape of the shell aids in an assumption of the second shape by the body. In greater detail, as shown in FIG. 9, the forming of operation 901 includes casting the materials of the aerodynamic component into the body having the second shape (9011) and cold working the body from the second shape into the initial shape (9012) and the deforming of operation 902 includes securing the body having the initial shape in a fixture (9021) and coating and/or laser drilling the body from the initial shape into the second shape (9022). In accordance with embodiments, the coating of operation 9022 can include electron-beam physical vapor deposition (EBPVD).

Figure 10:
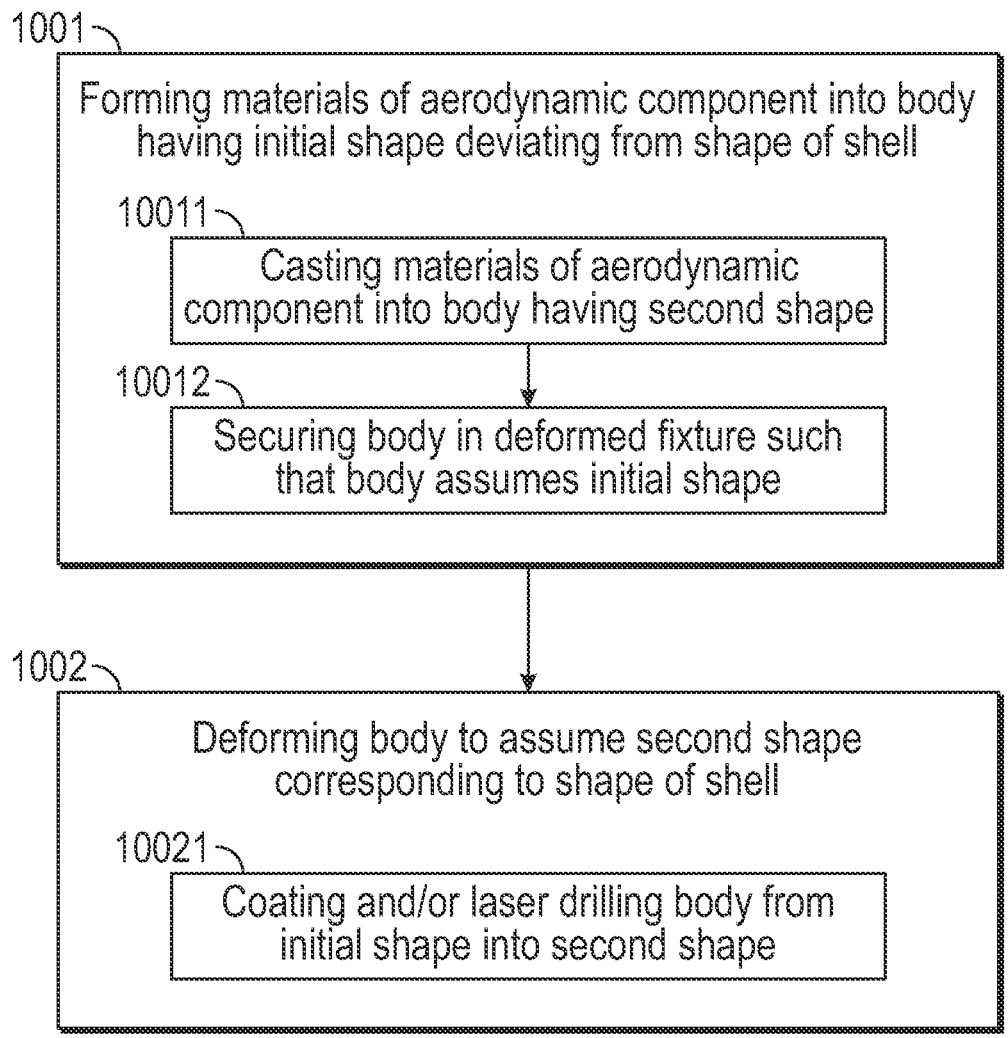
FIG. 10 is a flow diagram illustrating a method of manufacturing an aerodynamic component in accordance with embodiments.

With reference to FIG. 10, a method of manufacturing an aerodynamic component to be fittable to a shell in a gas turbine engine is provided and includes an initial manufacturing processing including forming materials of the aerodynamic component into a body having an initial shape that deviates from a shape of the shell (1001) and a subsequent manufacturing process including deforming the body to assume a second shape that corresponds to the shape of the shell (1002). Here, again, the forming of operation 1001 is executed such that deviation of the initial shape from the shape of the shell aids in an assumption of the second shape by the body. In greater detail, as shown in FIG. 10, the forming of operation 1001 includes casting the materials of the aerodynamic component into the body having the second shape (10011) and securing the body in a deformed fixture such that the body assumes the initial shape (10012) and the deforming of operation 1002 includes coating and/or laser drilling the body from the initial shape into the second shape (10021). In accordance with embodiments, the coating of operation 10021 can include electron-beam physical vapor deposition (EBPVD).

Figure 11:
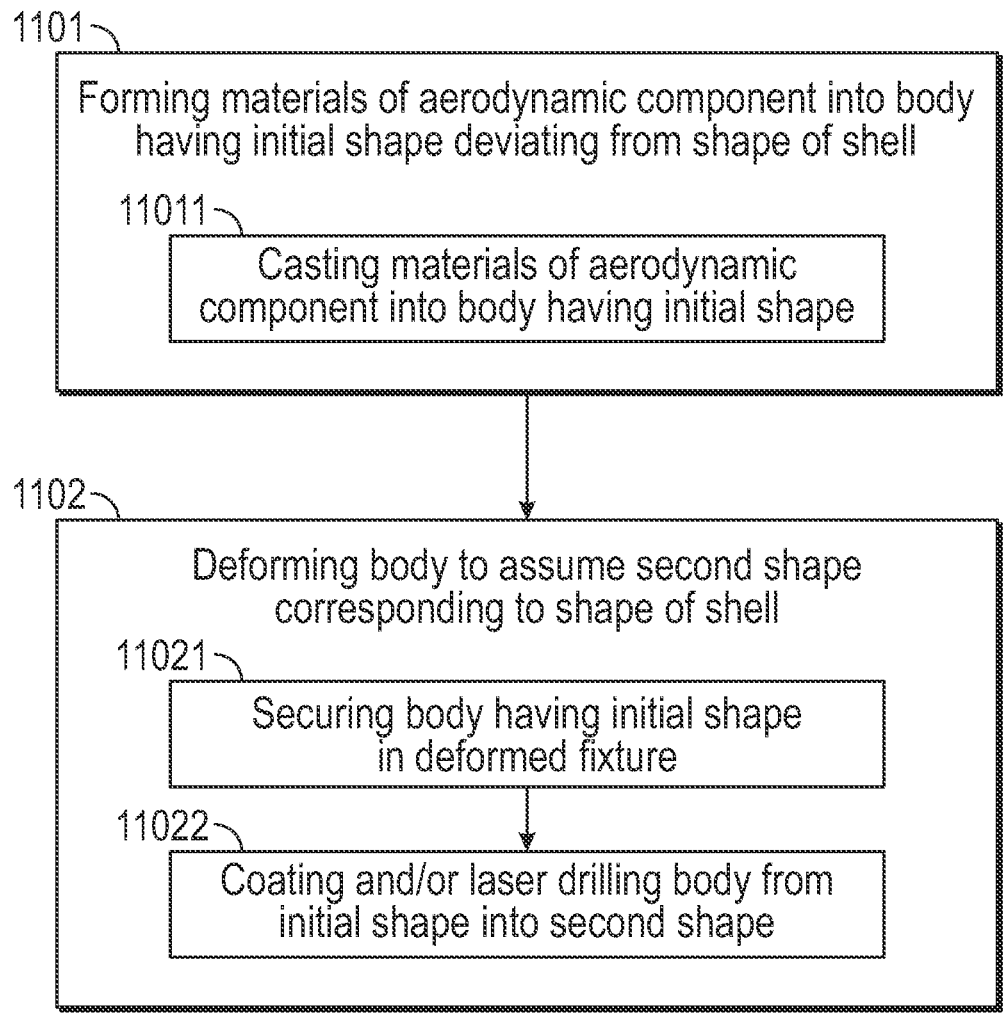
FIG. 11 is a flow diagram illustrating a method of manufacturing an aerodynamic component in accordance with embodiments.

With reference to FIG. 11, a method of manufacturing an aerodynamic component to be fittable to a shell in a gas turbine engine is provided and includes an initial manufacturing process including forming materials of the aerodynamic component into a body having an initial shape that deviates from a shape of the shell (1101) and a subsequent manufacturing processing including deforming the body to assume a second shape that corresponds to the shape of the shell (1102). Here, again, the forming of operation 1101 is executed such that deviation of the initial shape from the shape of the shell aids in an assumption of the second shape by the body. In greater detail, as shown in FIG. 11, the forming of operation 1101 includes casting the materials of the aerodynamic component into the body having the initial shape (11011) and the deforming of operation 1102 includes securing the body in a deformed fixture (11021) and coating and/or laser drilling the body from the initial shape into the second shape (11022). In accordance with embodiments, the coating of operation 11022 can include electron-beam physical vapor deposition (EBPVD).

Benefits of the features described herein are the reduction of residual stress in aerodynamic components, such as combustor panels, which is imparted by assembly processes where the combustor panels are "stuck down" to conform to the combustor shell. This will result in less premature coating spallation and greater combustor life. In addition, the combustor panels being "stuck down" provide for an increase in perimeter sealing effectiveness of impingement film float wall combustor panels with and without midrails (i.e., lower temperatures from less wasted air results in colder combustor panels and improved life.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of manufacturing an aerodynamic component to be fittable to a shell in a gas turbine engine, method comprising:
   forming materials of the aerodynamic component into a body having an initial shape that deviates from a shape of the shell; and
   deforming the body to assume a second shape that corresponds to the shape of the shell,
   the forming of the materials of the aerodynamic component into the body having the initial shape being executed such that deviation of the initial shape from the shape of the shell aids in an assumption of the second shape by the body,
   wherein one of:
   the forming comprises casting the materials of the aerodynamic component into the body having the second shape and cold working the body from the second shape into the initial shape and the deforming comprises securing the body having the initial shape in a fixture and coating and/or laser drilling the body from the initial shape into the second shape, and
   the forming comprises casting the materials of the aerodynamic component into the body having the second shape and securing the body in a deformed fixture such that the body assumes the initial shape and the deforming comprises coating and/or laser drilling the body from the initial shape into the second shape.

2. The method according to claim 1, wherein, for when the forming comprises the casting of the materials of the aerodynamic component into the body having the second shape and the cold working of the body from the second shape into the initial shape and the deforming comprises the securing of the body having the initial shape in the fixture and the coating of the body from the initial shape into the second shape, the coating comprises electron-beam physical vapor deposition (EBPVD).

3. The method according to claim 1, wherein, for when the forming comprises the casting of the materials of the aerodynamic component into the body having the second shape and the securing of the body in the deformed fixture such that the body assumes the initial shape and the deforming comprises the coating of the body from the initial shape into the second shape, the coating comprises electron-beam physical vapor deposition (EBPVD).

4. The method according to claim 1, wherein:
   the shell is an inner diameter shell with a substantially uniform radius of curvature,
   the shell comprises an exterior surface to which the aerodynamic component is fittable,
   the forming is executed such that the body has a radius of curvature, which is similar to the substantially uniform radius of curvature of the combustor shell at a central point of the body and which decreases toward opposite edges of the body, and
   the deforming is executed such that the body has a substantially uniform radius of curvature similar to the substantially uniform radius of curvature of the shell.

5. The method according to claim 1, wherein:
   the shell is an inner diameter shell with a substantially uniform radius of curvature,
   the shell comprises an exterior surface to which the aerodynamic component is fittable,
   the forming is executed such that the body has a radius of curvature, which is similar to the substantially uniform radius of curvature of the combustor shell at an edge of the body and which decreases toward an opposite edge of the body, and
   the deforming is executed such that the body has a substantially uniform radius of curvature similar to the substantially uniform radius of curvature of the shell.

6. The method according to claim 1, wherein:
   the shell is an outer diameter shell with a substantially uniform radius of curvature,
   the shell comprises an interior surface to which the aerodynamic component is fittable,
   the forming is executed such that the body has a radius of curvature, which is similar to the substantially uniform radius of curvature of the combustor shell at a central point of the body and which increases toward opposite edges of the body, and
   the deforming is executed such that the body has a substantially uniform radius of curvature similar to the substantially uniform radius of curvature of the shell.

7. The method according to claim 1, wherein:
   the shell is an outer diameter shell with a substantially uniform radius of curvature,
   the shell comprises an interior surface to which the aerodynamic component is fittable,
   the forming is executed such that the body has a radius of curvature, which is similar to the substantially uniform radius of curvature of the combustor shell at an edge of the body and which increases toward an opposite edge of the body, and
   the deforming is executed such that the body has a substantially uniform radius of curvature similar to the substantially uniform radius of curvature of the shell.

8. A method of aerodynamic component manufacturing, comprising:
   forming the aerodynamic component with an initial shape that deviates from a normal and final desired curvature during an initial manufacturing process; and
   deforming the aerodynamic component during a subsequent manufacturing process which results in the aerodynamic component being fittable to a shell,
   the forming being executed such that the aerodynamic component assumes the normal and final desired curvature upon completion of the deforming during the subsequent manufacturing process,
   wherein one of:
   the forming comprises casting and then cold working the aerodynamic component into the initial shape and the deforming comprises securing the aerodynamic component having the initial shape in a fixture and coating and/or laser drilling the aerodynamic component such that the aerodynamic component assumes the normal and final desired curvature, and
   the forming comprises casting the aerodynamic component to assume the normal and desired final curvature and securing the aerodynamic component in a deformed fixture such that the aerodynamic component assumes the initial shape and the deforming comprises coating and/or laser drilling the aerodynamic component such that the aerodynamic component assumes the normal and desired final curvature.

9. A method of manufacturing an aerodynamic component to be fittable to a shell in a gas turbine engine, method comprising:
   forming materials of the aerodynamic component into a body having an initial shape that deviates from a shape of the shell; and deforming the body to assume a second shape that corresponds to the shape of the shell, the forming of the materials of the aerodynamic component into the body having the initial shape being executed such that deviation of the initial shape from the shape of the shell aids in an assumption of the second shape by the body, wherein one of:

the shell is an inner diameter shell with a substantially uniform radius of curvature, the shell comprises an exterior surface to which the aerodynamic component is fittable, the forming is executed such that the body has a radius of curvature, which is similar to the substantially uniform radius of curvature of the combustor shell at one of a central point of the body and which decreases toward opposite edges of the body and an edge of the body and which increases toward an opposite edge of the body, and the deforming is executed such that the body has a substantially uniform radius of curvature similar to the substantially uniform radius of curvature of the shell, and the shell is an outer diameter shell with a substantially uniform radius of curvature, the shell comprises an interior surface to which the aerodynamic component is fittable, the forming is executed such that the body has a radius of curvature, which is similar to the substantially uniform radius of curvature of the combustor shell at a central point of the body and which increases toward opposite edges of the body and an edge of the body and which increases toward an opposite edge of the body, and the deforming is executed such that the body has a substantially uniform radius of curvature similar to the substantially uniform radius of curvature of the shell.

* * * * *